UNITED STATES PATENT OFFICE.

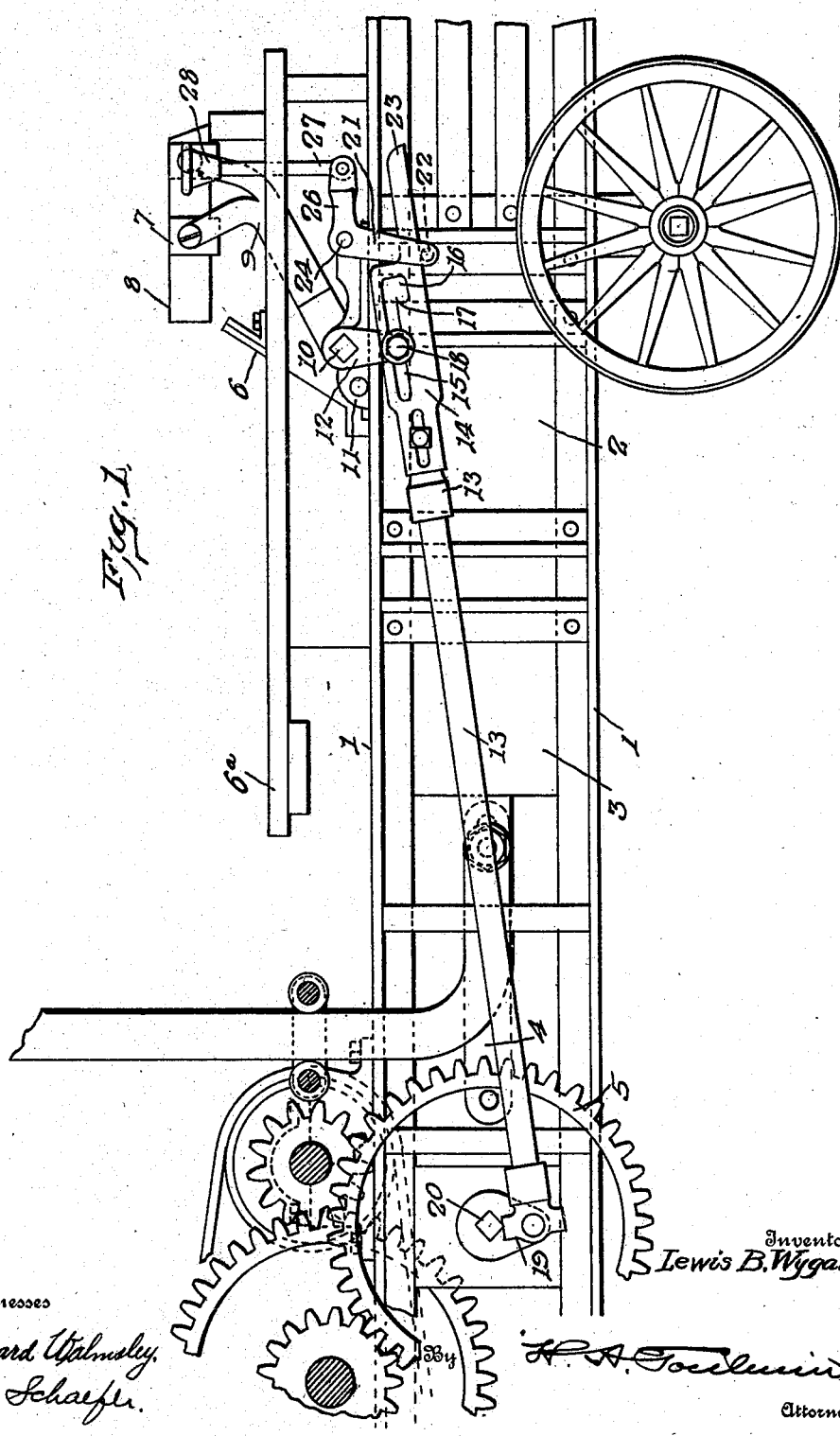

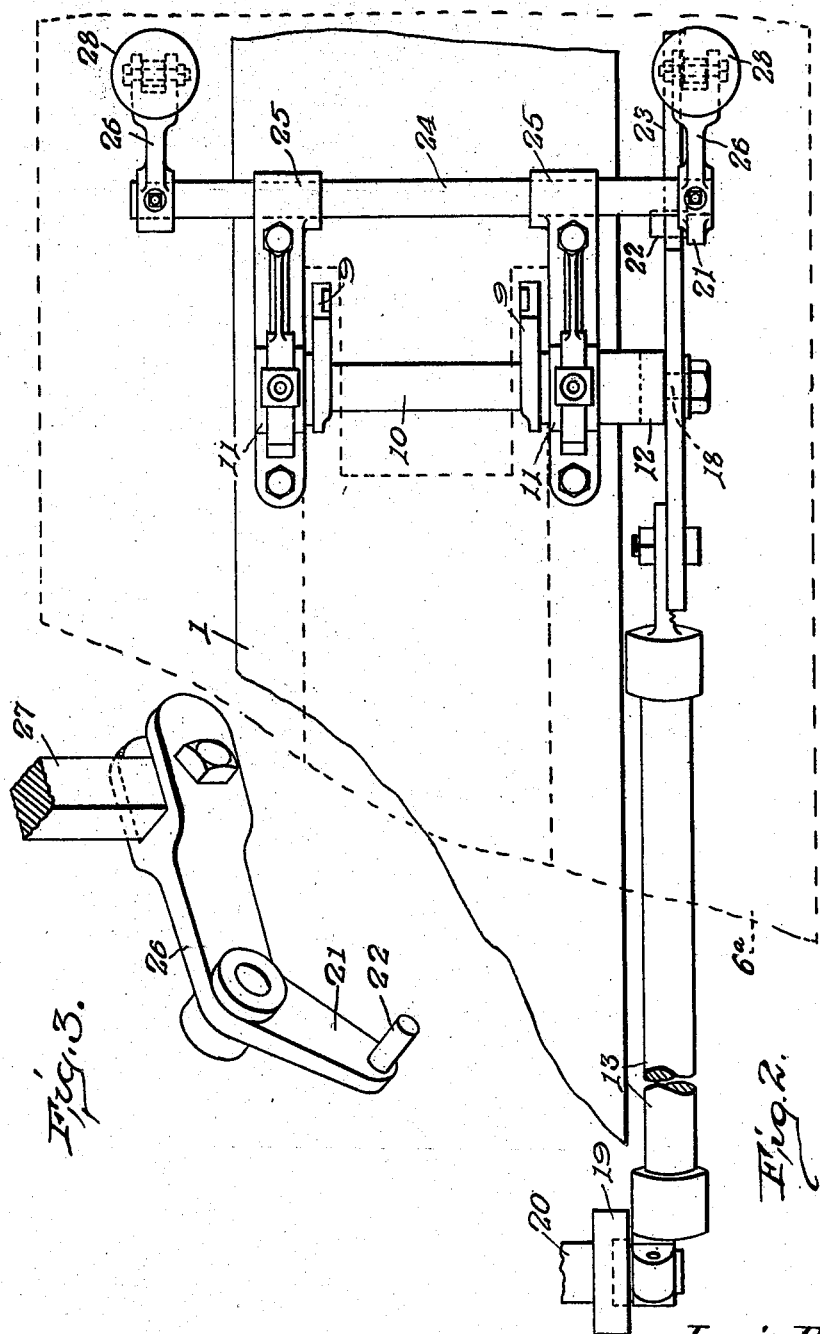

LEWIS B. WYGANT, OF BELLEVUE, OHIO, ASSIGNOR OF ONE-HALF TO THE OHIO CULTIVATOR COMPANY, OF BELLEVUE, OHIO, A CORPORATION OF OHIO.

HAY-PRESS.

No. 885,823.　　　　Specification of Letters Patent.　　Patented April 28, 1908.

Application filed December 26, 1907. Serial No. 408,161.

*To all whom it may concern:*

Be it known that I, LEWIS B. WYGANT, a citizen of the United States, residing at Bellevue, in the county of Huron and State of Ohio, have invented certain new and useful Improvements in Hay-Presses, of which the following is a specification, reference being had therein to the accompanying drawings.

This invention relates to hay presses, and is in the nature of an improvement upon the patent granted to Arthur E. Skadden for hay press on October 10, 1905, No. 801,343.

The object of the invention is to provide an improved means for actuating the block holder to move the division block into a vertical position in the compression chamber and for returning said block to its normal position, which actuating means will be simple, but positive in its operation; and to provide improved means for moving said actuating means into its operative position.

With these objects in view my invention consists in certain novel features of construction and in certain parts and combinations hereinafter to be described, and then more particularly pointed out in the claims.

In the accompanying drawings, Figure 1 is a side elevation of a portion of a hay press embodying my invention; Fig. 2 is a top plan view of a portion of the same; Fig. 3 is a detail view of the actuating arm adapted to engage the actuating rod.

In these drawings I have illustrated the preferred form of my invention and have shown the same as embodied in a hay press of a well known construction, the press being similar in all respects, save the actuating mechanism for the block holder, to that shown and described in the above-mentioned patent. In brief, the press comprises a frame 1 having a compression chamber 2, in which is mounted a reciprocating plunger 3 adapted to compress the hay in the said chamber and operatively connected by a suitable pitman 4 with the twin gears 5 forming a part of the power driven mechanism. The compression chamber 2 is provided in its upper side with the usual hopper or feed opening having its rear side beveled or inclined, as shown at 6. A suitable platform 6ª is supported on the main frame, and, preferably, extends entirely about the hopper or inlet opening for the compression chamber and forms a support upon which the operator stands to feed the hay to the press. The block holder 7 comprises a suitable guide or frame adapted to receive the division block 8 and is connected by means of suitable arms 9, secured to the opposite sides thereof and extending through longitudinal slots in the platform 6ª, with a rockshaft 10, which is journaled in suitable bearings 11 on the main frame 1 and has one end extending beyond its bearing and provided with an actuating arm 12. The block holder 7 and the block which is carried thereby normally occupy a substantially horizontal position, as shown in Fig. 1, and when it is desired to place the division block in position in the compression chamber, the shaft 10 is rocked to move the block holder into a vertical position with the block projecting into the compression chamber, in which position the block is adapted to be engaged and removed by a suitable mechanism provided for that purpose and not herein shown, and, after the block has been removed, the holder is again returned to its horizontal or idle position.

The means which I have provided for actuating the rockshaft to move the block holder into working position and to return the same to its horizontal or idle position comprises a suitable actuating rod or pitman 13, preferably having its rear end enlarged, as shown at 14, and provided with a longitudinal slot 15 having at its rear end an extension or recess 16 extending transversely of the actuating rod and having its forward wall cut away or recessed to form a finger or projection 17. This slot is adapted to receive, and form a guideway for, a part of the actuating arm 12, which, in the present instance, is in the form of a projection or bolt 18. The recess 16 being formed in the lower wall of the longitudinal slot, it will be apparent that the projection 18 will slide freely in the same without affecting the position of the actuating arm 12. Suitable movement may be imparted to the actuating rod 13 in any desired manner, preferably by connecting the same with the power driven mechanism for actuating the plunger and I have here shown this actuating rod as having its end pivotally connected to a crank arm 19 which is mounted on the outer end of the shaft 20, upon which one of the twin gears 5 is mounted, thus enabling the desired movement to be imparted to the actuating rod and also enabling this movement to be adjusted so as to time the movement of the division block relatively to the movement of the other parts of the press.

When it is desired to move the division block into position in the compression chamber, the slotted end of the actuating rod 13 is moved to cause the projection 18 on the arm 12 to enter the recess 16 and engage the shoulder formed by said recess. The finger 17 extends above the projection and prevents the same slipping out of said recess and over said shoulder. Thus, as the actuating rod moves rearwardly, the actuating arm 12 will be moved to rock the shaft 10 about its pivotal center and move the block holder 7 into its vertical position. As the actuating rod 13 moves forward, the rear wall of the slot will engage the projection 18 and rock the shaft 10 in the opposite direction, thus returning the block holder 7 to its normal or idle position. The means which I have provided for moving the actuating rod 13 to cause the projection 18 to enter the recess 16 consists of an arm 21 pivotally mounted on the main frame and provided near its lower end with a pin or finger 22 extending beneath the actuating rod and adapted to engage the same and move the rod upwardly when said arm is rocked about its pivotal center, the actuating rod being preferably provided with a rearward extension 23 to prevent the same from passing out of engagement with the pin 22. Suitable means are provided for actuating the arm 21, and, in order that this arm may be actuated from either side of the press, I prefer to rigidly mount the arm 21 upon one end of a shaft 24 which is journaled in suitable bearings 25 upon the main frame and is provided near either end thereof with arms or projections 26 extending at an angle to the arm 21 and pivotally connected to the lower end of suitable push rods 27 which extend through the platform 6ª and have their upper ends provided with foot pieces 28 which enable the same to be actuated by the operator's foot. The downward movement of the push rod rocks the shaft 24 and moves the pin 22 of the arm 21 into engagement with the actuating rod, and causes the same to actuate the arm 12 and move the division block into position in the compression chamber.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a hay press, the combination, with a compression chamber, a compressing plunger reciprocating therein, and power driven mechanism for actuating said plunger, of a division block holder pivotally mounted adjacent to the receiving mouth of the compression chamber, an actuating arm for said block holder having a projection, an actuating rod operatively connected to said power driven mechanism and having a guideway normally in engagement with said projection and provided with a recess forming a shoulder, and means controlled by the operator for moving said actuating rod to cause said shoulder to engage said projection.

2. In a hay press, the combination, with a compression chamber, a compressing plunger reciprocating therein, and power driven mechanism for actuating said plunger, of a division block holder pivotally mounted adjacent to the receiving mouth of the compression chamber, an actuating arm for said block holder having a projection, an actuating rod operatively connected to said power driven mechanism and having a longitudinal slot adapted to receive said projection and provided with a shoulder near one end thereof, and means controlled by the operator for moving said actuating rod to cause said shoulder to engage said projection.

3. In a hay press, the combination, with a compression chamber, a compressing plunger reciprocating therein, and power driven mechanism for actuating said plunger, of a division block holder pivotally mounted adjacent to the receiving mouth of the compression chamber, an actuating arm for said block holder having a projection, a pitman operatively connected to said power driven mechanism and provided with a longitudinal slot adapted to receive said projection and having a transverse extension near one end thereof forming a shoulder, and means controlled by the operator for moving said pitman to cause said shoulder to engage said projection.

4. In a hay press, the combination, with a compression chamber, a compression plunger reciprocating therein, and power driven mechanism for actuating said plunger, of a division block holder pivotally mounted adjacent to the receiving mouth of the compression chamber, an actuating arm for said block holder having a projection, an actuating rod operatively connected to said power driven mechanism and having a shoulder adapted to engage said projection, an arm pivotally mounted near said rod having a part extending beneath the same, and means for rocking said arm about its pivotal center to cause the shoulder carried by said actuating rod to engage said projection.

5. In a hay press, the combination, with a compression chamber, a compressing plunger reciprocating therein, and power driven mechanism for actuating said plunger, of a division block holder pivotally mounted adjacent to the receiving mouth of the compression chamber, an actuating arm for said block holder having a projection, an actuating rod operatively connected to said power driven mechanism and having a shoulder adapted to engage said projection, a rockshaft extending transversely of said compression chamber, an arm secured to one end of said shaft and having a part adapted to extend beneath said actuating rod, and a push rod operatively connected to said rockshaft and adapted to actuate the same to cause said arm to move said shoulder into position to engage said projection.

6. In a hay press, the combination, with a compression chamber, a compressing plunger reciprocating therein, and power driven mechanism for actuating said plunger, of a division block holder pivotally mounted adjacent to the receiving mouth of the compression chamber, an actuating arm for said block holder having a projection, an actuating rod operatively connected to said power driven mechanism and provided with a longitudinal slot adapted to receive said projection and having a transverse extension near one end thereof forming a shoulder, a rockshaft extending transversely of said compression chamber, an arm rigidly secured to said shaft having a part extending beneath said actuating rod, and push rods operatively connected to said rockshaft and adapted to actuate the same to cause said arm to engage said actuating rod and move said shoulder into a position to engage said projection.

In testimony whereof, I affix my signature in presence of two witnesses.

LEWIS B. WYGANT.

Witnesses:
  E. H. ERDRICH,
  E. A. KEMP.